United States Patent [19]

Omori et al.

[11] Patent Number: 4,651,239
[45] Date of Patent: Mar. 17, 1987

[54] METHOD AND APPARATUS FOR RECORDING A DIGITAL INFORMATION SIGNAL

[75] Inventors: Takashi Omori, Tokyo; Hiraku Sugiki, Urawa, both of Japan

[73] Assignee: Sony Corporation, Tokyo, Japan

[21] Appl. No.: 584,313

[22] Filed: Feb. 28, 1984

[30] Foreign Application Priority Data

Feb. 28, 1983 [JP] Japan ................................ 58-31962

[51] Int. Cl.[4] .................... G11B 21/10; G11B 5/02; G11B 5/03
[52] U.S. Cl. ........................................ 360/77; 360/27; 360/66
[58] Field of Search ............. 360/77, 27, 32, 48, 360/66

[56] References Cited

U.S. PATENT DOCUMENTS

| | | | |
|---|---|---|---|
| 3,263,031 | 7/1966 | Welsh .................................... | 360/77 |
| 4,439,799 | 3/1984 | Haubrich et al. ..................... | 360/77 |
| 4,490,756 | 12/1984 | Dost et al. ........................... | 360/77 |
| 4,528,605 | 7/1985 | Hiraguri ............................... | 360/77 |

Primary Examiner—Vincent P. Canney
Attorney, Agent, or Firm—Lewis H. Eslinger; Alvin Sinderbrand

[57] ABSTRACT

In a system for recording and reproducing digital signals on a magnetic tape using a rotary head, in which the signals are recorded as a series of slanted tracks without guard bands between adjacent slanted tracks, a pilot signal that was recorded during the recording process is used to control the tracking of the playback head. The pilot signal is recorded at a specific position in a specific pilot signal record region, independent from the region of the track at which the informational signal is recorded and the pilot signal is arranged at a predetermined position or positions being a specified distance from an end of each track in its longitudinal direction and only alternate tracks receive such pilot signal. When the recorded tracks are reproduced by a rotary playback head having a tracing width that is greater than the width of the track, the pilot signals from the adjacent tracks will be detected and can be compared in level, with the comparison output being used to control the tracking of the rotary playback head.

20 Claims, 52 Drawing Figures

METHOD AND APPARATUS FOR RECORDING A DIGITAL INFORMATION SIGNAL

BACKGROUND OF THE INVENTION

1. Field of the Invention:

The present invention relates generally to a method and apparatus for recording a digital information signal and, more specifically, relates to recording a digital information signal and a pilot signal using a rotary head and employing the pilot signal to control the tracking of the head during playback.

2. Description of the Art:

It is well known to pulse-code-modulate (PCM) a video signal and/or an audio signal for recording on a magnetic tape as a series of parallel, slanted tracks using a rotary head assembly of the helical scan kind. Subsequently, during reproduction of the recorded signals, the PCM signals are then appropriately demodulated back to the original analog form. The principal reason for such pulse-code-modulation of the video signal and the audio signal is that in that form the signals can be recorded and reproduced with much higher quality than the original analog signals.

In a video tape recorder the conventional tracking control system enables the rotary head to correctly trace the appropriate track upon playback and employs a control signal recorded along the length of the tape. This control signal is recorded and reproduced using a fixed stationary head, not the rotary head. Using the reproduced control signal from the longitudinal track, the rotational phase of the rotary head is maintained in a constant phase relationship. The fixed magnetic head that is required for this kind of tracking control, however, tends to prevent the recording and reproducing apparatus from being of compact size, because the fixed head requires its own mounting space and associated mounting hardware, all of which must be located inside the compact apparatus and arranged adjacent the tape guide drum.

Therefore, various approaches have been proposed to provide tracking control without requiring a separate fixed head. In one such previously proposed approach, an analog video signal is recorded and/or reproduced in a so-called superimposed condition, with no guard bands being formed between the adjacent tracks. In the superimposed condition, each rotary head has a different azimuth angle and each head is slightly wider than the resultant recorded track. This is accomplished during recording by having the edge portion of each successive track laid down by the respective head overlap the adjacent edge portion of the next preceding track. Each track then both overlaps the edge of the preceding track and has its opposite edge overlapped as well by the next successive track, thereby leading to the description, "superimposed." the edge portions of the two adjacent tracks that will be traced by the wide head during playback will not present a reproduction problem because these adjacent tracks were recorded by a head having a different azimuth gap angle than the track being reproduced and those signals will not be reproduced with a level that could degrade the desired signal. In this superimposed tracking control approach, four different kinds (frequencies) of tracking pilot signals are recorded by the rotary heads on the tracks in which the video signal is recorded in the superimposed state. The pilot signals are selected to have a low frequency relative to the video signal being recorded, and are in a region outside the frequency spectrum of the video signals being recorded, so that upon playback they can be easily separated one from another.

Nevertheless, a principal feature of this tracking control method becomes its major drawback because signals having relatively low frequencies, such as these low-frequency pilot signals, are difficult to erase. Accordingly, when the pilot signal is erased in making a new recording following this superimposed approach, a portion of the previously recorded pilot signal remains unerased. Furthermore, depending upon the modulation system employed, when the information signal to be recorded has a frequency spectrum in the low-frequency band region, such as the PCM signal would have, it becomes extremely difficult to separate the pilot signals from the signals of interest. Moreover, since this tracking control method employs four kinds of pilot signals, that is, signals having four different frequencies, the attendant circuitry becomes complex and expensive. Another approach to providing tracking control in a rotary head video tape recorder is taught in U.S. Pat. No. 4,141,048, assigned to the assignee hereof, in which the pilot signal is recorded in the horizontal blanking period of the video signal. Nevertheless, since the pilot signal is in the same frequency band region as the video signal, it is once again difficult to reproduce the pilot signal accurately when reproducing the recorded video signal.

OBJECTS AND SUMMARY OF THE INVENTION

Accordingly, it is an object of the present invention to provide a method and apparatus for recording a digital information signal employing a tracking control system that overcomes the drawbacks inherent in the prior art.

It is another object of the present invention to provide a method and apparatus for recording a digital information signal in which tracking control of the head is accomplished using a pilot signal recorded along with the information signal in a series of slanted, parallel tracks on the magnetic tape.

It is a further object of the present invention to provide a method and apparatus for recording a digital information signal using a rotary head in which tracking control of the head is accomplished using a pilot signal recorded at predetermined locations on the tracks containing the information signal.

According to one aspect of the present invention, an information signal is digitized and the digitized information recorded on the record medium using a rotary head, the digitized information is recored as a series of parallel, slanted tracks on a magnetic record medium without guard bands, and a tracking pilot signal is recorded at a location on every other track that is different than the location the digitized information signal is recorded, wherein such pilot signals are recorded at predetermined positions that are equal in distance from an end of the slanted tracks in the longitudinal direction of the track.

Other objects, features, and advantages of the present invention will become apparent from the following detailed description taken in conjunction with the accompanying drawings, throughout which like references designate the same elements and parts.

DETAILED DESCRIPTION OF PREFERRED EMBODIMENT

Figure 1:
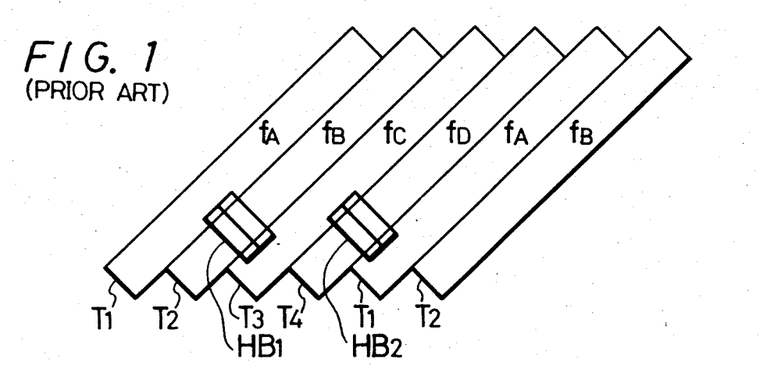
FIG. 1 is a representation of a recorded track pattern formed by a rotary head using a conventional tracking control system.
Figure 2:
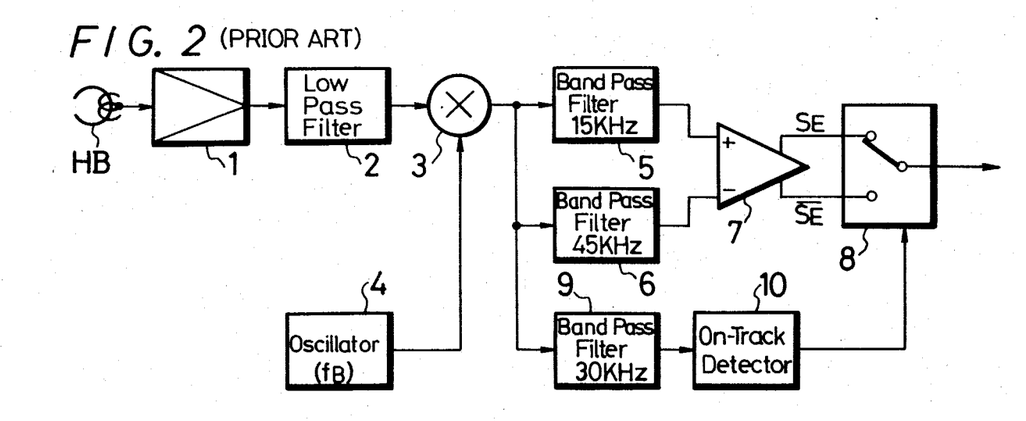
FIG. 2 is a schematic block diagram of a conventional tracking control system for a rotary head recording and reproducing apparatus.

FIGS. 1 and 2 relate to a conventional tracking control system of the kind for use in the so-called superimposing system involving pilot signals of different frequencies, as discussed hereinabove. In this known system, typically two rotary heads are separated by an angular distance of 180° and have different azimuth gap angles, and the four pilot signals employed have mutually different frequencies, for example, $f_A = 100$ kHz, $f_B = 115$ kHz, $f_C = 160$ kHz, and $f_D = 145$ kHz. In FIG. 1, one rotary head HA (not shown) lays down every other track, $T_1$ and $T_3$, sequentially on the record medium, in which a frequency modulated video signal is recorded as the information signal. A pilot signal having the frequency $f_A$ is recorded on track $T_1$ along with the information signal in the superimposed fashion, and a pilot signal of frequency $f_C$ is recorded on track $T_3$ along with the information signal in the superimposed fashion. The other rotary head HB sequentially forms every other track, $T_2$ and $T_4$, which also contain the frequency modulated video signal in the superimposed fashion. A pilot signal of frequency $f_B$ is recorded in track $T_2$, and in track $T_4$ a pilot signal of a frequency $f_D$ is recorded along with the respective information signals recorded according to the so-called superimposition manner.

Upon playback, tracking control is carried out by means of the system shown in FIG. 2, however, to simplify the explanation only the tracking control appropriate for head HB is shown. The tracking control for head HA would be substantially identical to that shown in FIG. 2.

Correct tracking or "just" tracking is taken as the situation when head HB correctly traces tracks $T_2$ and $T_4$, and in FIG. 2 the output signal produced by head HB is fed through playback amplifier 1 to low-pass filter 2, which extracts only the pilot signal of the low-frequency band. This low-frequency band component extracted from the signal detected by head HB is fed to multiplying circuit 3, wherein it is multiplied with a signal having a frequency $f_B$ produced by oscillator 4.

Referring to FIG. 1, when head $HB_1$ traces track $T_2$, multiplying circuit 3 produces a signal $E_1$ of frequency $f_B - f_A = 15$ kHz, and produces a signal $E_2$ of frequency $f_C - f_B = 45$ kHz. Of course, head $HB_1$ also detects signal $f_B$, however, when the two inputs to multiplier 3 are the same no output signal ($f_B - f_B$) will be produced. Similarly, when head $HB_2$ traces track $T_4$ in FIG. 1, multiplying circuit 3 produces output signal $E_1$ of frequency $f_B - f_A$ and output signal $E_2$ of frequency $f_C - f_B$, additionally, because $f_D$ is not equal to $f_B$, as in tracks $T_1$ and $T_3$, a third signal $S_I$ is produced having a frequency $f_D - f_B = 30$ kHz.

Signals $E_1$ and $E_2$ are derived from the reproduction of the pilot signals from the adjacent tracks, that is, the tracks not intended to be directly traced by head HB. In other words, head HB detects two other pilot signals in addition to the pilot signal associated with the specific track that it is principally tracking. Thus, as is clear from FIG. 1, if the output levels of both signals $E_1$ and $E_2$ from signal multiplier 3 are equal, then this indicates that head HB is correctly tracing tracks $T_2$ and $T_4$. Thus, tracking control is carried out to maintain the level of the reproduced signals $E_1$ and $E_2$ equal.

The output from multiplying circuit 3 is connected directly to first bandpass filter 5 that has a frequency cut off of 15 kHz, so that the output from bandpass filter 5 is signal $E_1$ having a frequency of 15 kHz. The output from multiplying circuit 3 is also directly connected to second bandpass filter 6 having a cut off frequency of 45 kHz, so that the output from bandpass filter 6 is signal $E_2$ having a frequency of 45 kHz. Signals $E_1$ and $E_2$ are fed to respective input terminals of differential amplifier 7, which produces an output that corresponds to the difference in levels between signals $E_1$ and $E_2$. The output signal from differential amplifier 7 is then used to control the transport speed of the tape in order to reduce this output signal to zero. In this system, however, the frequency relationship between the pilot signals from the right and left adjacent tracks periodically reverses with respect to tracks $T_2$ and $T_4$. Accordingly, depending upon whether head HB is tracing track $T_2$ or $T_4$, the direction of the control signal must be reversed. That is, when head HB (HB$_1$) traces track $T_2$, the output of the pilot signal of frequency $f_B$ recorded directly on track $T_2$ cannot be obtained from the multiplying circuit 3, as explained hereinabove. Nevertheless, when head HB (HB$_2$) traces track $T_4$, signal $S_I$ having a frequency of $f_D-f_B=30$ kHz is obtained from multiplying circuit 3. Thus, when signal $S_I$ is detected, the direction or polarity of the control signal, as might be produced from differential amplifier 7, is reversed. Conventional differential amplifiers, such as differential amplifier 7 in FIG. 2, easily produce output signals of opposite polarity, and in this embodiment such output signals are represented by signals $S_E$ and $\overline{S}_E$ fed to respective fixed input terminals of switching circuit 8. The output from multiplying circuit 3 is also fed directly to third band-pass filter 9 having a cutoff frequency of 30 kHz and, the output from bandpass filter 9 is fed to on-track detecting circuit 10. Thus, when signal $S_I$ is present, bandpass filter 9 will pass only signal $S_I$ to on-track detector 10, which will produce a control signal fed to switch 8 to switch over the output connection resulting in an output of polarity opposite that of the preceding signal, and this signal can be fed to the capstan motor to control the transport rate of the tape.

Similarly, in regard to the other rotary head $H_A$ not shown, in FIG. 1, oscillator circuit 4 or a corresponding oscillator would provide a signal of frequency $f_A$ to multiplying circuit 3 and, thus, in the case of track $T_1$, signals having frequencies $f_B-f_A=15$ kHz and $f_D-f_A=45$ kHz would be generated from multiplying circuit 3 as the pilot signals output from the tracks adjacent the principal track. Accordingly, the capstan motor and tape transport speed would be controlled to reduce the level difference between the pilot signals to zero. In this example, when a signal with frequency $f_C-f_A=60$ kHz is detected, it may be noted that this signal corresponds to signal $S_I$ above, the direction or polarity of the control signal is reversed. Because of the physical/mechanical construction of the typical rotary heads, when tracking control is accomplished using the above described system it is generally only necessary to provide a control system for one of the two rotary heads since the other rotary head is held in a fixed relationship with the other head within close tolerances and, thus a tracking control system is only required for one head.

The above-described known system employs relatively low-frequency pilot signals and such low-frequency pilot signals are difficult to erase. When the signal is recorded in the superimposed fashion on a track in which similar signals had been previously recorded, at the time the previous signals are being erased this disadvantage relating to imperfect erasing is important. Depending upon the kind of modulation signal, when the information signal to be recorded has a frequency spectrum in the low-band region, for example, a PCM signal, it is difficult to separate the pilot signals from one another. Moreover, as seen from the circuit of FIG. 2, because four different pilot signal frequencies are employed, the circuit arrangements can become unduly complicated.

Figure 3:
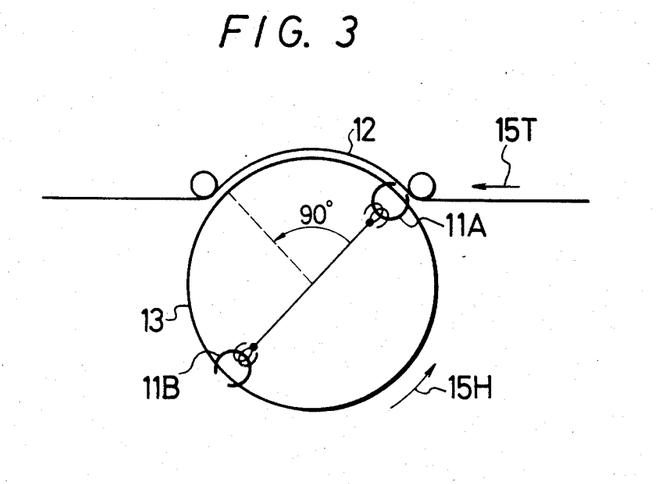
FIG. 3 is a representation of a rotary head assembly for use with the present invention.
Figure 4:
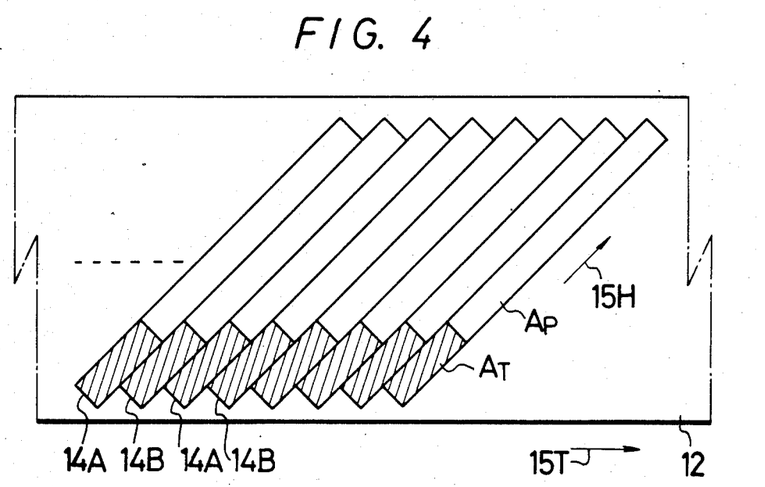
FIG. 4 is a representation of a recorded track pattern formed using the present invention.

In the following description of some embodiments of the present invention, a rotary magnetic head assembly as represented in FIG. 3 is assumed to be used. In this rotary magnetic head assembly there are two rotary heads 11A and 11B arranged with equal angular separation, that is, an angular distance of 180°. Magnetic tape 12 is wrapped around a peripheral surface of tape guide drum 13 over an angular range less than 180°, specifically over 90°, as shown in FIG. 3. Rotary heads 11A and 11B are rotated at the rate of 30 revolutions per second in a direction indicated by arrow 15H and magnetic tape 12 is transported at a predetermined speed in a direction indicated by arrow 15T, so that a series of slanted, parallel tracks 14A and 14B, as shown in FIG. 4, will be formed on magnetic tape 12 by rotary heads 11A and 11B in the so-called superimposed condition. That is, the tracking width W of the head gap is selected to be larger than the final track width. Once again, the angles of the gaps of heads 11A and 11B are selected to be different in order to take advantage of the so-called azimuth loss phenomenon.

Upon inspection of the rotary head assembly of FIG. 3, it will be seen that there is a period of time, in this example a time corresponding to an angular range 90°, during which neither of the rotary heads 11A and 11B contact magnetic tape 12. If this non-contact period is used to perform the addition of redundant data when recording and to perform data correction when reproducing, the construction of the recording and reproducing apparatus can be simplified. An example of such improved rotary head assembly is seen in U.S. patent application, Ser. No. 06/485,065, filed Apr. 14, 1983, and assigned to the assignee hereof.

In FIG. 4, each of tracks 4A and 4B is separated into a PCM signal recording region $A_P$ and a tracking signal recording region $A_T$, shown by the cross-hatched portions in the tracks. The manner in which the tracking control pilot signals are recorded in regions $A_T$ is a feature of the present invention and is described in detail hereinbelow. It may be noted, however, that the cross-hatching lines in regions $A_T$ of FIG. 4 do not correspond to the azimuth gap angles of the respective heads.

In the following, an audio signal is assumed to be PCM recorded and in FIG. 5 an audio signal $S_A$ is fed in at input terminal 21 to analog-to-digital convertor 22, therein converted to a digital PCM signal, and this PCM signal is subsequently fed to recording encoder 23. In recording encoder 23, the signal to be recorded in one track, which can be referred to as a one-segment signal and which may represent the digital audio signal of every period corresponding to a one-half rotation of the rotary heads 11A and 11B, is compressed in time base by an amount slightly less than the tape contact period of the heads, the error correction codes are generated and added at this time, and the interleave processing and the like is carried out. The output signal from recording encoder 23 is supplied to recording processor 24 in which a block synchronizing signal, address data, and the like are added to each block formed of the plurality of words, and the signal is finally modulated into a signal suitable for recording and reproducing on a magnetic medium.

The PCM signal from recording processor 24 is fed to a fixed contact of switching circuit 25 that is used to change recording regions between $A_P$ and $A_T$, and in one position of switching circuit 25 the signal from recording processor 24 is fed through switching circuit 25 to a second switching circuit 26, which is used for head switching. Switching circuits 25 and 26 are changed over in response to respective switching signals $S_2$ and $S_1$ produced by timing signal generating circuit 28. Timing signal generating circuit 28 is supplied with a signal indicating the rotary phase of rotary heads 11A and 11B, as represented by pulsed signal PG of frequency 30 Hz, which indicates the phase of rotary heads 11A and 11B generated by pulse generator 17 in synchronism with the revolutions of motor 16, which drives heads 11A and 11B. Pulsed signal PG and a pulse signal of 30 Hz cycles from timing signal generator 28 are both fed to phase servo circuit 29 and, thus, the rotary phase of motor 16 is controlled by a servo signal output therefrom.

Figures 5, 6A:
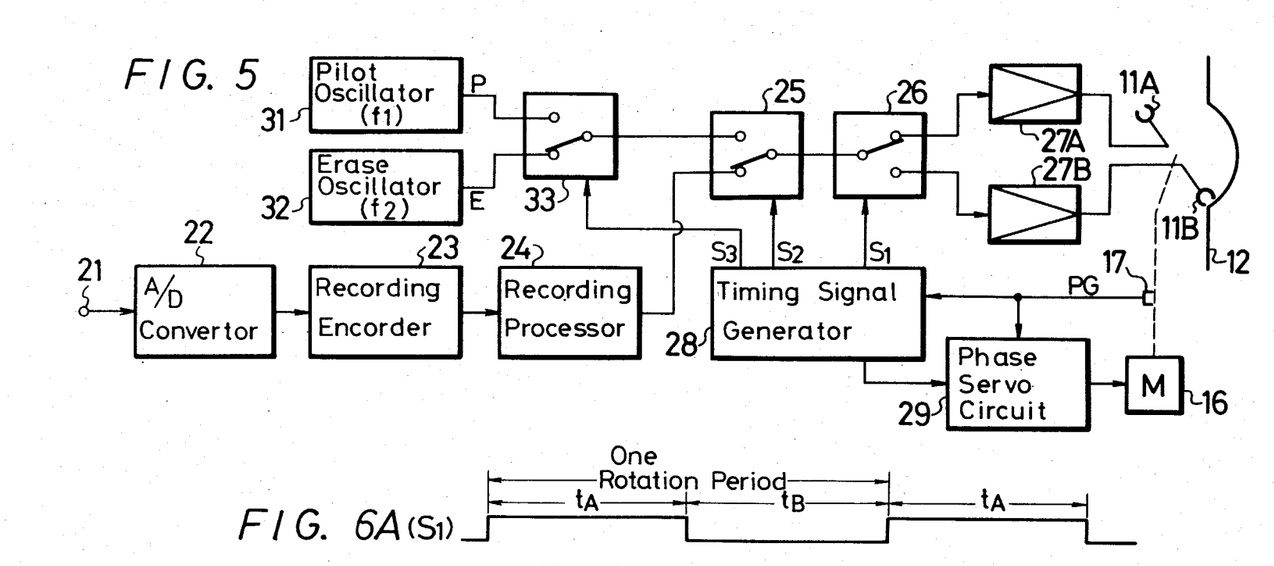
FIG. 5 is a schematic block diagram of a system for recording information signals and tracking control pilot signals according to the present invention.
FIGS. 6A–6E are waveform diagrams useful in explaining the operation of the circuit of FIG. 5.
Figure 6B:
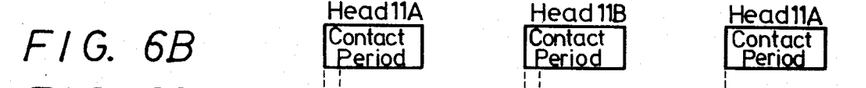
Figure 6C:
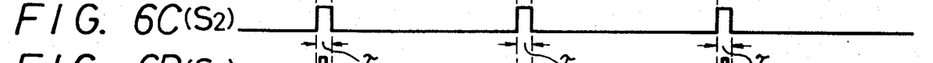

As a result of this operation, switching signals $S_1$ and $S_2$ are in synchronism with the rotation of rotary heads 11A and 11B so that, as shown in FIG. 6B, within one-half rotation $t_A$ of the head, during which the switching signal $S_2$ is at a high level, head 11A contacts magnetic tape 12, whereas within the one-half rotation period $t_B$ during which switching signal $S_1$ is at a low level, head 11B contacts magnetic tape 12. Also, switching signal $S_2$ is at a high level during a short period $\tau$ at the beginning of each head/tape contact period. Then, in response to switching signal $S_1$, switching circuit 26 is changed over in position, as shown in FIG. 5, during the period $t_A$, similarly, switching circuit 26 is changed over to a position opposite that shown in FIG. 5 during the period $t_B$, thereby performing signal switching between heads 11A and 11B. On the other hand, in response to switching signal $S_2$ switching circuit 25 is changed over to be in the position shown in FIG. 5 during the period in which switching circuit $S_2$ is at a low level, while switching signal 25 is changed over to a position opposite that shown in FIG. 5 during the period when signal $S_2$ is at a high level.

Accordingly, during periods other than the period at the beginning of the head/tape contact period for heads 11A and 11B within periods $t_A$ and $t_B$, respectively, switching circuit 25 is changed over to the position shown in FIG. 5 so that, in response to the operation of switching circuit 26, an audio PCM signal of one segment amount from recording processor 24 is supplied through recording amplifier 27A to head 11A during period $t_A$, whereas an audio PCM signal is supplied through recording amplifier 27B to head 11B during period $t_B$ and is thereby recorded on the information record regions $A_P$ of tracks 14A and 14B, respectively. This signal division in the appropriate tracks is represented in FIGS. 6E.

During the period of time $\tau$ at the beginning of the tape/contact periods of both heads 11A and 11B, switching circuit 25 is changed over to a position opposite that shown in FIG. 5, and at that time the signal from switching circuit 33, that is, either the pilot signal or the erase signal, is fed through switching circuit 25 to switching circuit 26. Switching circuit 33 obtains the pilot signal P from pilot signal oscillator 31 having an oscillatory frequency $f_1$ and obtains the erasing signal E, to be used to erase any previous pilot signals from erase oscillator 32 that has an oscillatory frequency $f_2$. Switching circuit 33 is selectively controlled by switching signal $S_3$ produced by timing signal generator 28. Frequency $f_1$ of pilot signal P is selected to be one which causes a relatively small azimuth loss, for example, within a frequency range of 100 kHz to 500 kHz, and the pilot signal P is recorded at a relatively high level.

The erase signal E is used to erase the previously recorded pilot signal because when a new recording is carried out in the superimposed state on a tape in which an information signal was previously recorded, even though the previously recorded information is being erased, the newly recorded track is not always coincident with the preceding track. The frequency $f_2$ of the erase signal E is selected to be sufficiently separated from frequency $f_1$ and is selected to be a value which can erase pilot signal P, and its also level is selected as one which can erase pilot signal P.

Figures 6D, 6E:
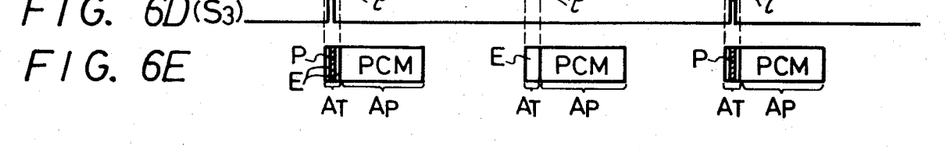

Switching signal $S_3$, which controls the operation of switching circuit 33, goes to a high level only within the time period $\tau$ at the beginning of the head/tape contact period of head 11A that occurs within period $T_A$, as shown in FIG. 6D. As a result, switching circuit 33 is changed over in position to connect the pilot signal P from oscillator 31 only during the period in which switching circuit $S_3$ is at a high level. Thus, in this embodiment, the high-level period of switching signal $S_3$ is selected to have a duration of approximately $\tau/3$ and is arranged at substantially the center of the time period $\tau$. Accordingly, during the period $\tau/3$ at the center of period arranged within time period $t_A$, the pilot signal P from oscillator 31 is recorded by head 11A on the center positions of the recording region $A_T$ of every other track.

Figure 7:
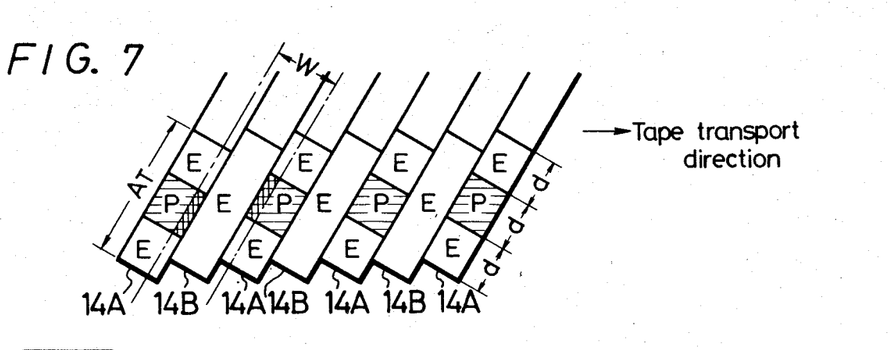
FIG. 7 is a representation of recorded track pattern formed according to the present invention and showing the recorded positions of the tracking control pilot signals therein.

In FIG. 7, the location of the pilot signal P shown by the hatched areas is at the center of each of the portions $A_T$ and bounded by erase signals E. It may be noted also that the pilot signal P appears only on every other recorded track. During all other times, except the period $\tau/3$ at the center of period $\tau$ within period $t_A$, switching circuit 33 is changed over to be in the position shown in FIG. 5, so that erase signal E from oscillator 32 is recorded by head 11A before and after the pilot signal recording positions in recorded regions $A_T$ of tracks 14A, as represented in FIG. 6E and FIG. 7.

On the other hand, during the period of time that occurs within the time period $t_B$, although switching circuit 25 is changed over in position to be connected to switching circuit 33, switching circuit 33 will remain in the position shown in FIG. 5. Thus, during the period at the beginning of the tape/head contact period of head 11B, which occurs within time period $t_B$, erase signal E is supplied to head 11B. This is represented in FIGS. 6E and 7, so that the erase signal E is recorded over the entire region $A_T$ on all successive tracks 14B.

As will be clear from FIG. 7, in this embodiment the recorded positions of the pilot signals are adjusted so as not to be superimposed upon each other in relation to a direction perpendicular to the longitudinal direction of tracks 14A and 14B. A technique similar to that described hereinabove in regard to recording pilot signals can also be applied in a video tape recorder, wherein the recording positions of the horizontal synchronising signal of the video signal are arranged in a direction perpendicular to the longitudinal direction of the track. In such case, assuming the length of the tape 12 in the longitudinal direction is given by d, which corresponds to the $\tau/3$ period, the positions of the end portions of the track are displayed by d/2 in the longitudinal direction of the track, between adjoining tracks 14A and 14B.

Figure 8:
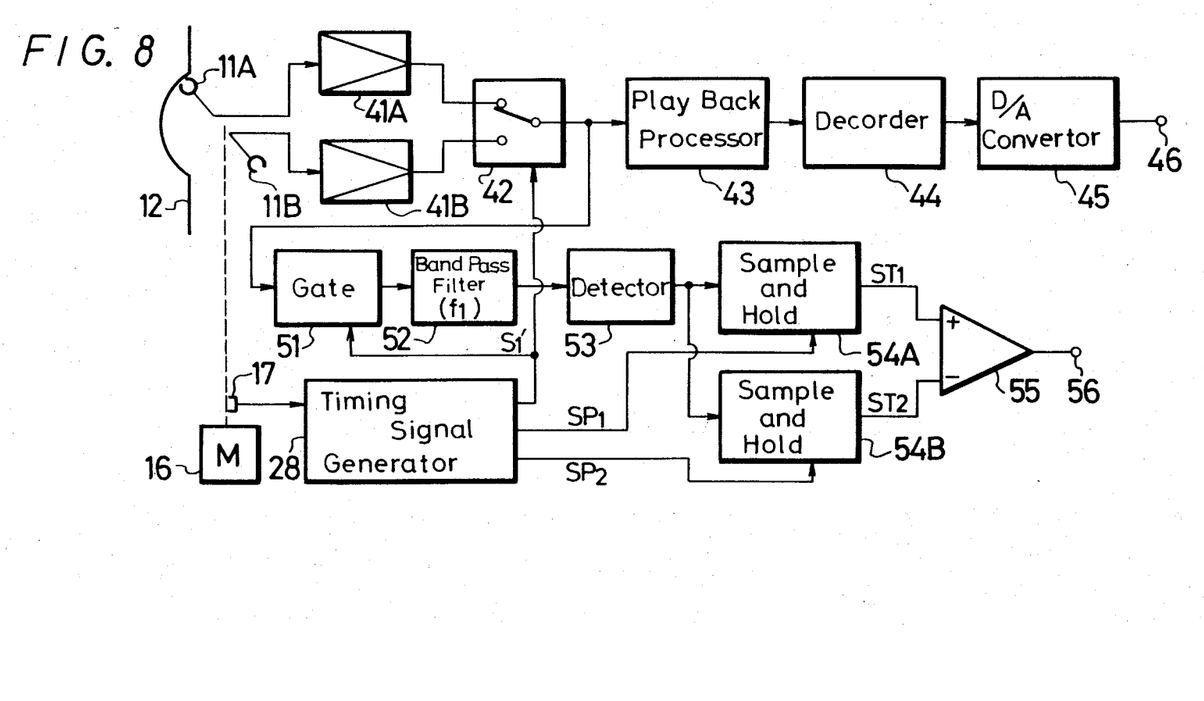
FIG. 8 is a schematic block diagram of a reproducing system according to the present invention.

FIG. 8 is a schematic block diagram of a system for reproducing or playing back signals recorded in accordance with the above and, although not shown, motor 16 is servo controlled to maintain correctly the head drum phase in the same fashion as that described in regard to the recording operation. Signals reproduced from tape 12 by rotary heads 11A and 11B are fed through head amplifiers 41A and 41B, respectively, to switching circuit 42. Switching circuit 42 is controlled to be alternately changed over in position in response to switching signal $S_1'$ having a frequency of 30 kHz and produced by timing signal generator 28 at every half-rotational period includes the tape contact periods of heads 11A and 11B. Accordingly, the output from switching circuit 42 is an intermittent PCM signal of one segment each, as represented at FIG. 6E. This PCM signal is fed to playback processor 43 where it is demodulated back to the original PCM signal frequency, and the demodulated PCM signal is fed to decoder 44. Decoder 44 utilizes the block synchronising signal and other processing signals, such as the error-correction signal and the de-interleave signal, so that the data is detected in every block. This PCM signal comprising the data portion that has been decoded by decoder 44 is fed to a digital-to-analog (D/A) convertor 45, wherein it is reconverted to the analog audio signal that is fed to output terminal 46.

Figure 9A:
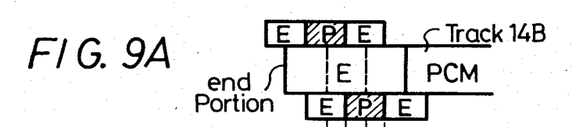
FIGS. 9A–9E are waveform diagrams useful in explaining the operation of the circuit of FIG. 8.
Figures 9B, 9C:
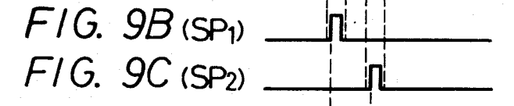
Figure 9D:
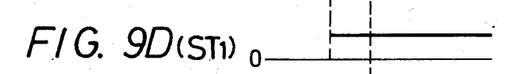
Figure 9E:
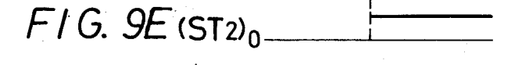

The present invention is intended to control the tracking of the rotary heads, such as heads 11A and 11B, and this control signal originates from switching circuit 42 and is fed to gate circuit 51, which is controlled by the switching signal $S_1'$ produced by timing signal generator 28, that is also fed to control switching circuit 42. Switching signal $S_1'$ controls gate 51 to derive only the signal reproduced by head 11B from the composite signal at the output of switching circuit 42. Referring also to FIG. 7, if head 11B has a gap width that traces a range width W over track 14B and also extends into adjacent tracks 14A, head 11B will produce the pilot signals P in the region $A_T$, as represented in FIG. 9A. This reproduced output signal from head 11B is fed through gate 51 to bandpass filter 52, which has a center frequency $f_1$ of sufficiently narrow bandwidth to pass only pilot signal P. Pilot signal P from bandpass filter 52 is then fed to detector 53, in which the presence of the pilot signal P is detected, and the output signal from detector 53 is fed to sample-and-hold circuits 54A and 54B, respectively. Sampling pulses, as shown in FIGS. 9B and 9C, are generated by timing-signal generator 28 and fed to sample-and-hold circuits 54A and 54B, respectively. Sampling pulse signal $SP_1$, as represented in FIG. 9B, has a frequency of 30 Hz and timing signal generating circuit 28 generates the sampling pulses at any point within the time period that corresponds to the range of distances from the position of the end portion of track 14B that is larger than d but smaller than 3/2 d. Similarly, timing signal generating circuit 28 generates sampling pulse signal $SP_2$, the waveform of which is shown in FIG. 9C, having a frequency of 30 Hz at any point within the time period that corresponds to the range of distances from the position of the end portion of track 14B, which is larger than 2d but smaller than 5/2d. As represented in FIG. 9A, during playback when head 11B traces track 14B, sampling pulse signal $SP_1$ samples the cross-talk component of the pilot signal from track 14A adjacent to track 14B on the side opposite the tape transport direction, so that sample-and-hold circuit 54A derives tracking signal $ST_1$ advanced in phase; tracking signal $ST_1$ is represented in FIG. 9D. Similarly, sampling pulse $SP_2$ signal samples the cross-talk component of the pilot signal P from track 14A adjacent to track 14B on the tape transport direction side, so that sample-and-hold circuit 54B produces a tracking signal $ST_2$ delayed in phase; the waveform of tracking signal $ST_2$ is shown in FIG. 9E.

The tracking signals $ST_1$ and $ST_2$ produced by sample-and-hold circuits 54A and 54B, respectively, are fed to the two respective input terminals of differential amplifier 55, which compares the levels of these two input signals. Accordingly, the output signal from differential amplifier 55 is the difference between the two input levels and is fed to output terminal 56 where it is available to the capstan motor (not shown) to control the tape transport speed, so that the level difference between outputs $ST_1$ and $ST_2$ is reduced to zero. Such zero level difference between the two tracking signals $ST_1$ and $ST_2$ means that when head 11B traces track 14B it extends over into the two tracks 14A adjacent track 14B by equal amounts, that is, the tracing of head 11B is controlled so that the center of the gap of head 11B is coincident with the center of the track 14B being traced.

Figure 10A:
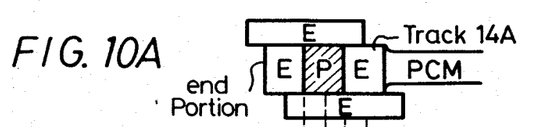
FIGS. 10A–10E are waveform diagrams useful in explaining the operation of the present invention in the reproducing mode.
Figures 10B, 10C:
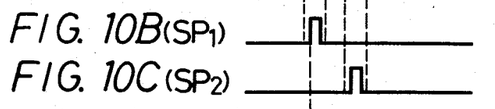
Figure 10D:
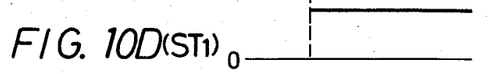
Figure 10E:
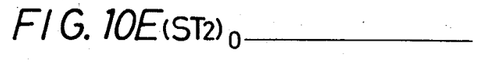

On the other hand, if head 11B is misaligned during playback and over its width W erroneously traces a path that contains mainly track 14A, the record region $A_T$ will appear as represented in FIG. 10A. In that situation, sampling pulse signal $SP_1$, the waveform of which is represented in FIG. 10B, samples the reproduced output of the pilot signal P from track 14A and produces output signal $ST_1$ having a high level, as shown in FIG. 10D. Because no pilot signal P is reproduced at the corresponding playback time, sampling pulse signal $SP_2$, which controls sample-and-hold circuit 54B, will result in a zero level signal so that the output signal from differential amplifier 55 will be a high-level tracking signal having an advanced or leading phase. Thus, the tracing position of head 11B will be changed considerably under control of this high-level signal and will control the tape transport rate so that head 11B traces track 14B correctly.

Figure 11:
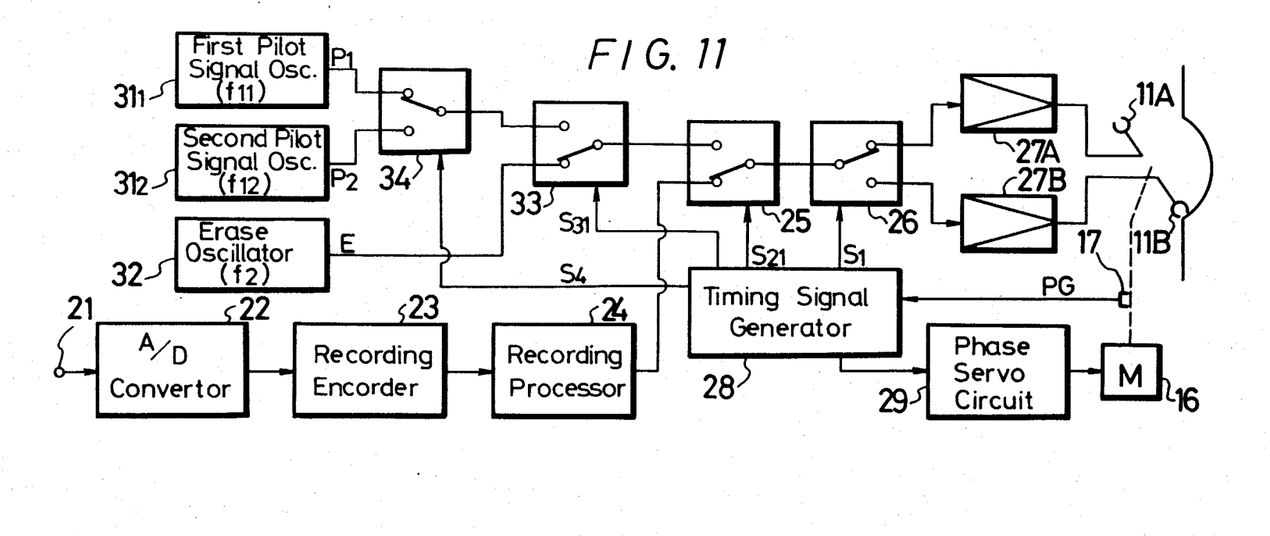
FIG. 11 is a schematic block diagram of an embodiment of a reproducing system according to the present invention.
Figure 12A:
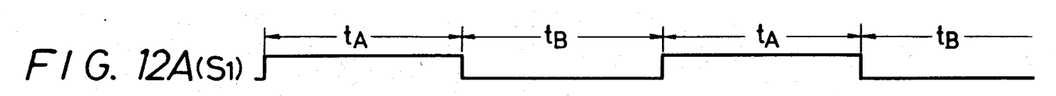
FIGS. 12A–12F are waveform diagrams useful in explaining the operation of the system of FIG. 11.
Figure 12B:
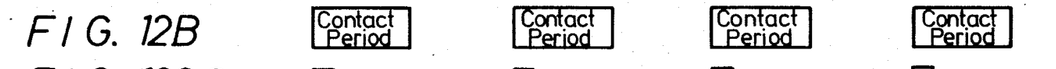
Figures 12C, 12D:
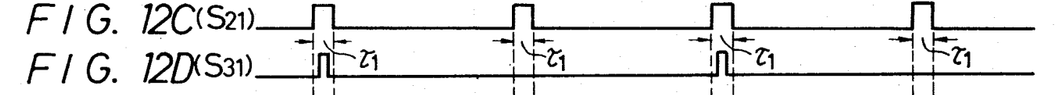
Figure 12E:
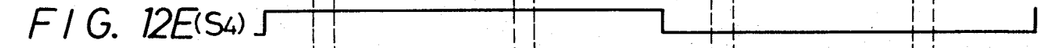
Figure 13:
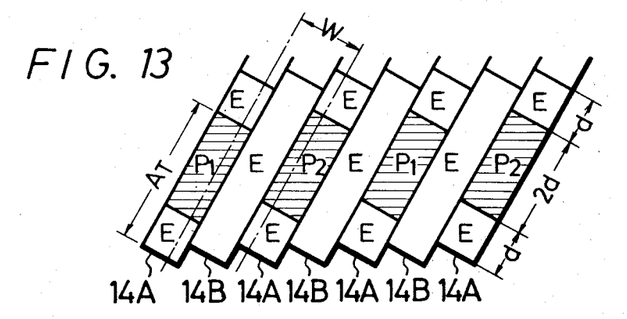
FIG. 13 is a representation of a recorded track pattern formed in accordance with the embodiment of FIG. 11.

In the embodiment described above, the crosstalk components of the pilot signals reproduced from the tracks immediately adjacent the track of interest are sampled and held at different time points under control of the sampling pulse signals $SP_1$ and $SP_2$, however, such crosstalk components can also be sampled at the same time in a manner shown in the following. Referring to FIG. 11, an embodiment of a recording system is shown in which the switching circuit 25, which is the same as in the embodiment of FIG. 5, is controlled by signal $S_{21}$, the waveform of which is shown in FIG. 12C, that has a pulse width represented by $\tau_1$. This pulse width $\tau_1$ corresponds to 4d and represents the duration of the period at the beginning of the tape head contact periods for heads 11A and 11B, which corresponds to region $A_T$ described hereinabove, and is selected to be longer than the period $\tau$ that corresponded to a length 3d in the embodiment of FIG. 5. In this embodiment, the record portion of the pilot signal in the region $A_T$ of track 14A is selected to be of duration equal to 2d, as represented in FIG. 13, and the erase signal is recorded with a duration d arranged before and after the record region. Just as in the above described example, only the erase signal E is placed in region $A_T$ on track 14B. In this embodiment, pilot signals of two different frequencies are employed, specifically, pilot signal $P_1$ has a frequency denoted by $f_{11}$ and pilot signal $P_2$ has a frequency denoted by $f_{12}$ and during recordation thereof the two pilot signals are alternately recorded. In the embodiment shown in FIG. 11, the first pilot signal $P_1$ of frequency $f_{11}$ is generated by first oscillator $31_1$ and is fed to one fixed contact of switch 34, and the second pilot signal $P_2$ of frequency $F_{12}$ is produced by second oscillator $31_2$ and fed to the other fixed contact of switching circuit 34. Switching circuit 34 is controlled to be alternately changed over in position at each rotation of head 11A in response to switching signal $S_4$ produced by timing signal generator 28. The waveform of timing signal $S_4$ is shown in FIG. 12E and may be derived by frequency dividing by one half the head switching signal $S_1$, which is shown in FIG. 12A. The pulse width of the switching signal from switching circuit 33, which acts to separate the region $A_T$ of track 14A into the record regions of the pilot signal and the erase signal is selected to correspond to 2d, which is the center duration of the period $\tau_1$ within the period $T_A$; signal $S_{31}$ is represented in FIG. 12D. The remaining circuit elements in the embodiment of FIG. 11 are identical to those of FIG. 5.

Figure 12F:
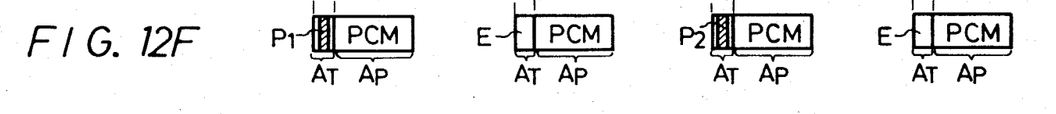

Accordingly, the result of the operation of the circuit of FIG. 11 is to record pilot signals $P_1$ and $P_2$ of different frequency alternately on successive tracks 14A for a time length which is twice as long as that provided in the embodiment shown in FIG. 5; and this is represented in FIG. 12F. The recorded portion $A_T$ is shown in greater detail in FIG. 13, in which it is seen that from the direction perpendicular to the longitudinal direction of the track the record region of the pilot signal on each track is caused to overlap in time with the record region of the adjoining pilot signal by a duration d.

Figure 14:
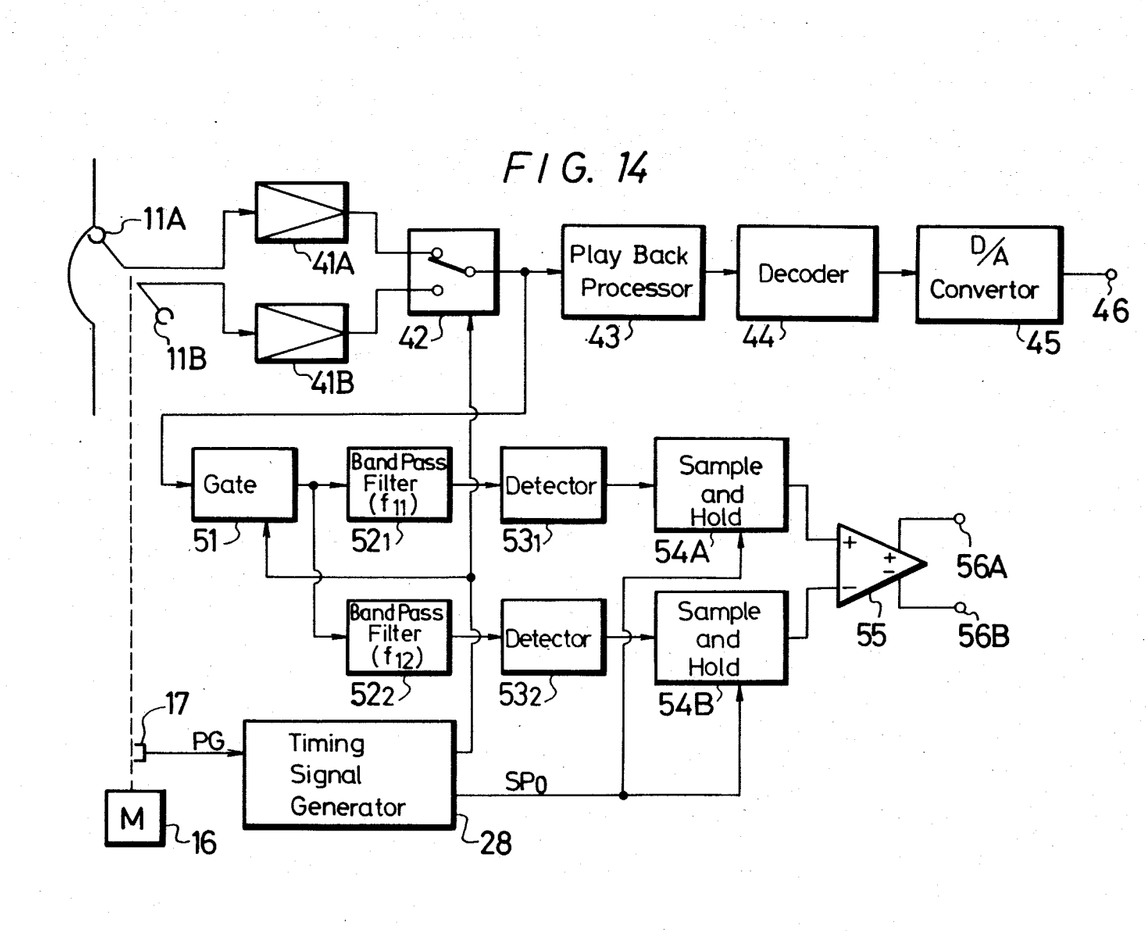
FIG. 14 is a schematic block diagram of an embodiment of a reproducing system according to the present invention.
Figures 15A, 15B:
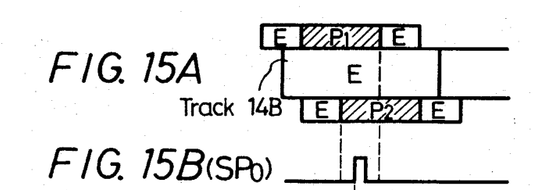
FIGS. 15A–15D are waveform diagrams useful in explaining the operation of the system of FIG. 14.
Figure 15C:
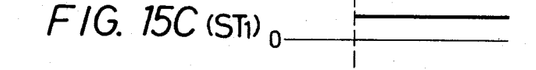
Figure 15D:
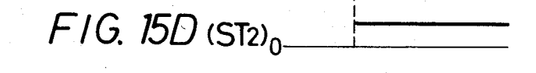

Tracking control during playback is accomplished by the circuit of FIG. 14, in which the reproduced output of head 11B is again derived from gate 51 and is fed to first bandpass filter $52_1$ having a center frequency $F_{11}$ in the pass band, and the reproduced output signal from head 11B is also fed to second bandpass filter $52_2$ that has a center frequency $F_{12}$ in the pass band. It may be noted that these center frequencies of the respective bandpass filters are the frequencies of the first and second pilot signals that have been alternately recorded in tracks 14A following the embodiment of FIG. 11. Thus, as represented in FIG. 13, when head 11B traces a width W that contains track 14B, as represented in FIG. 15A, pilot signals $P_1$ and $P_2$ are obtained from the respective tracks 14A adjacent track 14B. Assuming proper head alignment for just tracking, the crosstalk signals of both pilot signals $P_1$ and $P_2$ are obtained in the range from the portion separated from the end of track 14B by 3/2d to the portion separated from the end of track 14B by 5/2d. Accordingly, bandpass filter $52_1$ will produce the crosstalk component of pilot signal $P_1$, which is fed to detector circuit $53_1$ to determine whether such pilot signal is present. The output signal from detector $53_1$ is fed to corresponding sample-and-hold circuit 54A. Meanwhile, bandpass filter $52_2$ produces crosstalk components relative to pilot signal $P_2$ that are fed to detector $53_2$, whose output is fed to sample-and-hold circuit 54B. During the time period in which the pulses in pilot signals $P_1$ and $P_2$ are co-existent, timing signal generator 28 generates a sampling pulse $SP_0$, the waveform of which is shown in FIG. 15B, that is fed to both sample-and-hold circuits 54A and 54B, respectively. Accordingly, differential amplifier 55 once again will produce an output signal representing the level difference between the outputs $ST_1$ and $ST_2$ derived by sample-and-hold circuits 54A and 54B, respectively, from the detected outputs of pilot signals $P_1$ and $P_2$, respectively. The waveforms of the sample-and-hold output signals $ST_1$ and $ST_2$ are shown in FIGS. 15C and 15D, respectively.

In this embodiment, because the relationship between phase lead and phase lag of the two pilot signals is reversed at every track, differential amplifier must have an additional output signal in order to develope the appropriate control signal. Thus, differential amplifier 55 produces at output terminal 56A, output signals having the same phase, that is, in phase, and produces at output terminal 56B output signals having opposite phase. These output signals then are alternately switched upon each rotation of the head. In the interest of clarity and brevity the appropriate switching circuit is not shown, however, switching between the two output signals of differential amplifier 55 could be accomplished as follows. The switching operation can be carried out by detecting whether the pilot signal output in the signal reproduced from head 11A during the half-rotation period is the pilot signal $P_1$ that appeared in the signal reproduced from head 11A during its preceding half-rotation period. The pilot signal $P_1$ contained in the signal reproduced from head 11B has an advanced phase and the pilot signal $P_2$ has a delayed phase, when pilot signal $P_2$ appears in the signal reproduced from head 11A during the preceding half-rotation period, the above phase relationship is reversed.

Figure 16A:
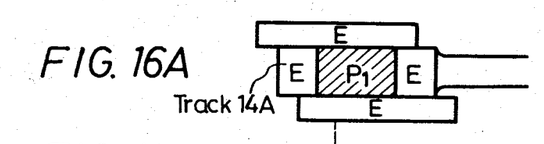
FIGS. 16A–16D are waveform diagrams useful in explaining the operation of the system of FIG. 11.
Figure 16B:
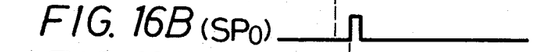
Figure 16C:
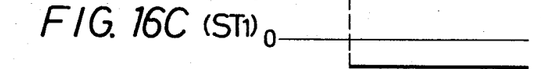
Figure 16D:
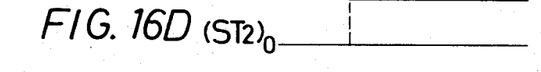

In the situation where head 11B is misaligned and erroneously traces part of tracks 14B adjacent to track 14A although tracing mainly track 14A, the representation of the traces located near region $A_T$ is shown in FIG. 16A. It may be noted that only the single respective pilot signal will be detected, since no pilot signals are recorded on either side of the track 14A and in response to the sampling pulse $SP_0$ only pilot signal $P_1$ or $P_2$ will be reproduced from track 14A and sampled in the respective sample-and-hold circuit and only output signal $ST_1$, represented in FIG. 16C, or output signal $ST_2$, represented in FIG. 16D, can become high so that the tape transport rate will be changed to control head 11B in order to trace track 14B correctly. In the representation of FIGS. 16C and 16D sample-and-hold circuit 54B produces the output signal $ST_2$ and, thus, the alignment of head 11B is seen.

In the two embodiments of the invention that have been described hereinabove the reproduced output of either of two heads 11A and 11B is used to detect and control the tracking of that particular head. The reason for this is that the two heads are fixedly mounted on the rotary drum, so that if one head traces a track under the just or aligned tracking condition then the other head must also trace its respective track under the aligned or just tracking condition. Nevertheless, to achieve the highest tracking accuracy it is advantageous to control both heads, and an embodiment of the present invention shown in FIG. 7 can accomplish this. The system of FIG. 17 produces recorded tracks represented in FIG. 19, in which pilot signal P of frequency $f_1$ is recorded in track 14A at a distance between d and 2d from the end of the track. Pilot signal P', also having a frequency $f_1$, is recorded on track 14B but arranged at a distance between 3d and 4d from the end of the track. Thus, the length of the recording region $A_T$ for each track is selected to be 5d from the end of the track, including the region of the erase signal.

Figure 17:
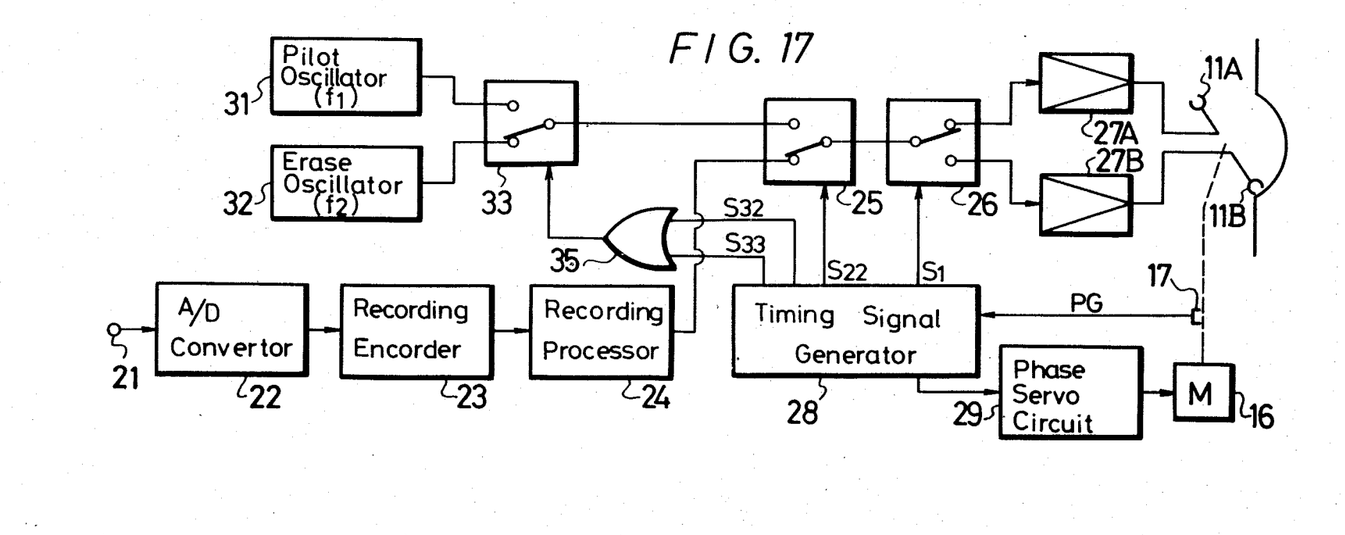
FIG. 17 is a schematic block diagram of an embodiment of a recording system according to the present invention.
Figure 18A:
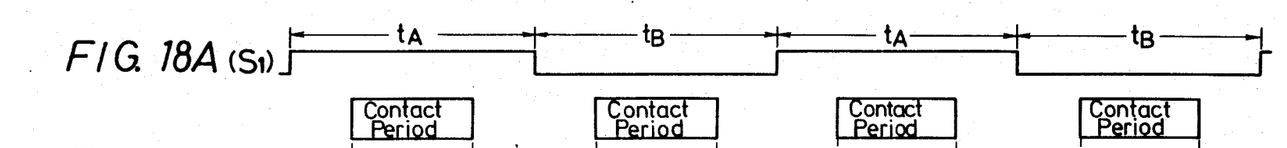
FIGS. 18A–18E are waveform diagrams useful in explaining the operation of the system of FIG. 17.
Figures 18B, 18C:
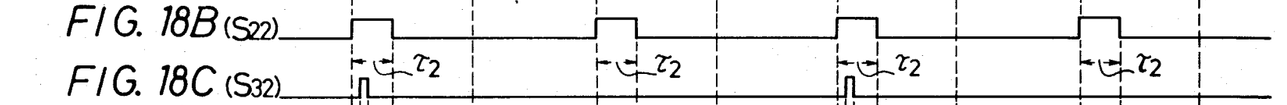
Figure 18D:
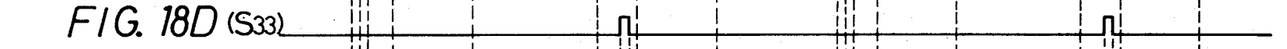
Figure 18E:
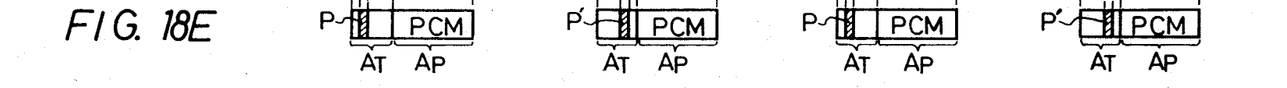
Figure 19:
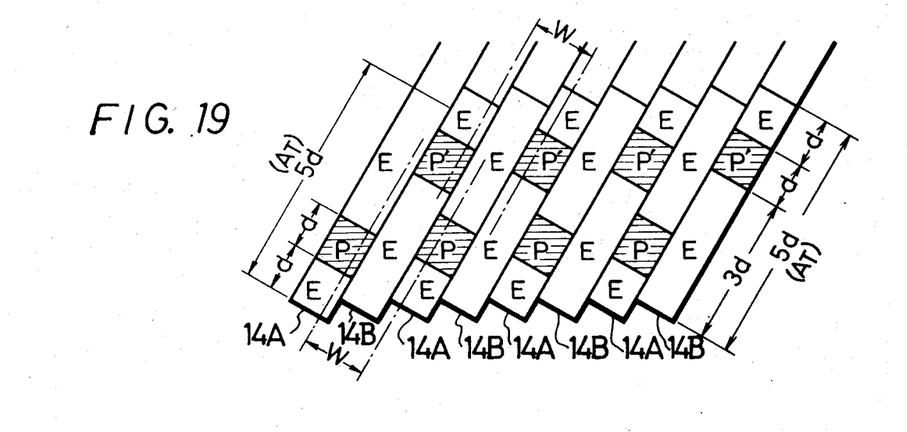
FIG. 19 is a representation of a recorded track pattern made in accordance with the embodiment of FIG. 17.

The recording system of FIG. 17 is substantially the same as that of FIG. 5, however, the control for switching circuit 25, which determines the length of the region $A_T$, is signal $S_{22}$ of pulse width $\tau_2$ that corresponds to length 5d. The waveform of switching signal $S_{22}$ is shown in FIG. 18B. The signal that controls switching circuit 33, which determines the recorded position of the pilot signal in the region $A_T$, is derived from the output of OR gate 35, which has as inputs signals $S_{32}$ and $S_{33}$ produced by timing signal generator 28. The waveform of timing signal $S_{32}$ is shown in FIG. 18C, and it is seen that signal $S_{32}$ has a high level corresponding to the range of distance from d to 2d from the end of track 14A during the period $\tau_2$, which occurs within period $T_A$. Similarly, signal $S_{33}$ shown in FIG. 18D has a high level corresponding to the range of distance from 3d to 4d from the end of track 14B during the period $\tau_2$, which occurs within period $T_B$. Thus, the signals which are supplied to heads 11A and 11B, respectively, during the tape/head contact periods are shown in FIG. 18E and at the region $A_T$ the recorded patterns are shown in FIG. 19.

Figure 20:
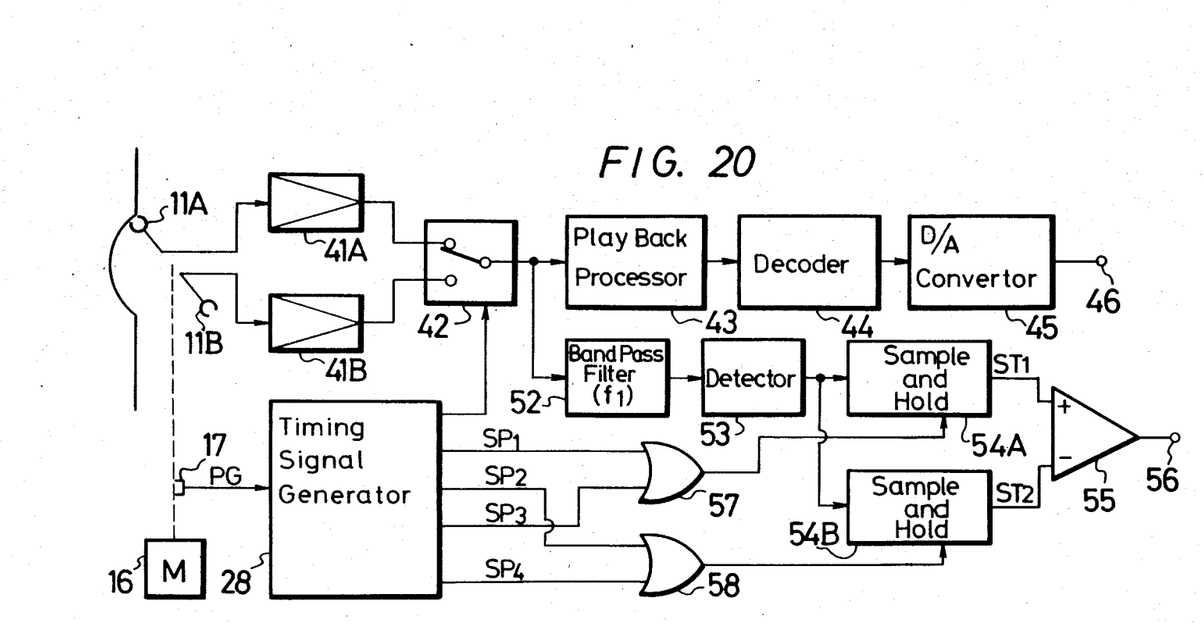
FIG. 20 is a schematic block diagram of another embodiment of a reproducing system according to the present invention.

During playback, tracking control of the heads is accomplished by a system shown in FIG. 20, in which the reproduced output signal from head 11B is processed in the circuit of FIG. 20 in the same manner as in the embodiment disclosed in FIGS. 5 and 17. More specifically, the sampling pulse signals $SP_1$ and $SP_2$ are fed to respective sample-and-hold circuits 54A and 54B with the outputs thereof being compared by differential amplifier 55 to produce an output at terminal 56. In the embodiment of FIG. 20, however, sampling pulse signal $SP_1$ is fed to OR gate 57, output of which is fed to sample-and-hold circuit 54A, and sampling pulse signal $SP_2$ is fed to OR gate 58, the output of which is fed to sample-and-hold circuit 54B. It may be noted that OR gates 57 and 58 would not have any effect on the overall operation of the system. Accordingly, tracking control for head 11B is carried out just as in the above-described embodiments.

Figure 21A:
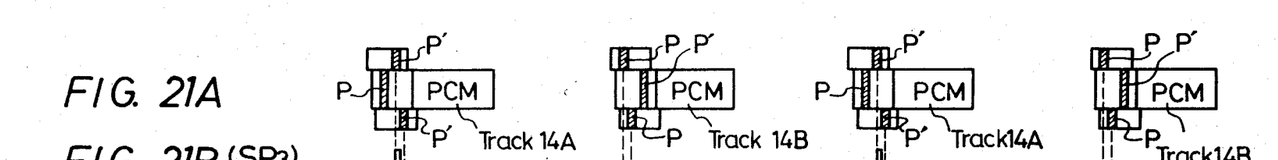
FIGS. 21A–21E are waveform diagrams useful in explaining the operation of the system of FIG. 20.
Figures 21B, 21C, 21D, 21E:
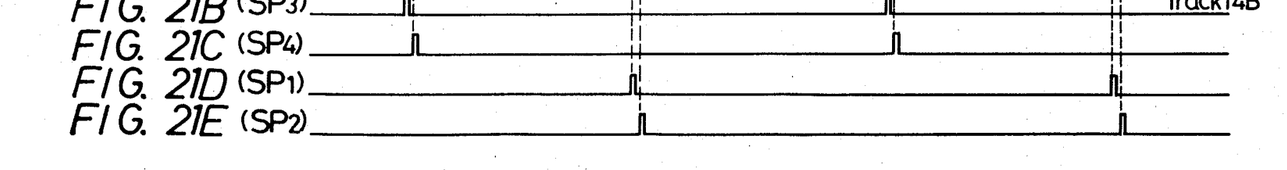

In regard to the tracking control of head 11A, sampling pulse signal $SP_3$ and sampling pulse signal $SP_4$ are produced by timing signal generator 28 and have waveforms as shown in FIGS. 21B and 21C, respectively. Sampling pulse signals $SP_3$ and $SP_4$ can sample the respective crosstalk signals of pilot signals P' from the two tracks 14B adjacent track 14A, and sampling pulse signal $SP_3$ is fed to OR gate 57, the output of which is connected to sample-and-hold circuit 54A, and sampling pulse signal $SP_4$ is fed to OR gate 58, the output of which is connected to sample-hold-circuit 54B. The outputs of the two sample-and-hold circuits are fed to differential amplifier 55 to generate the tracking error signal, which controls head 11A. Thus, both heads can be controlled using essentially the same circuitry without requiring separate dedicated systems.

As may be seen in the above-described embodiments of the present invention, because the pilot signal to accomplish tracking control is recorded at a different region on the same track than the PCM information signal, it is relatively easy to detect the pilot signal during reproduction. Moreover, if at some later time it is desired to re-record new information in the superimposed fashion directly over previously recorded information, the region in the track for the pilot signal is different than that on which the PCM informational signal is recorded and, thus, the frequency of the pilot signal can be selected to be relatively high. This permits the previously recorded pilot signal to be erased relatively easily and to thereby overcome the problems described above.

In the three embodiments of the present invention described so far, the timing signal generating unit 28 is supplied with pulse signal PG that indicates the rotary phases of the rotary heads 11A and 11B as determined by a pulse generator 17. Nevertheless, it is also possible to use the present invention without employing pulse generator 17 by stopping the tape and recording a predetermined signal by rotary heads 11A and 11B, so that upon reproduction the exact point in time at which heads 11A or 11B start to contact the tape can be detected, and such detected signal is used to obtain the appropriate timing. Moreover, it is pointed out that in the embodiment described in relation to FIGS. 17 to 21 the reproduced output timing of the pilot signal from the track being traced may also be used to provide the sampling pulse signals $SP_1$ to $SP_4$.

While the above embodiments have been described in relation to two rotary heads, the present invention can also be advantageously employed in a single head embodiment. This is possible because the track on which the pilot signal is recorded at the predetermined position and the next track on which the pilot signal are not recorded are alternately provided and, thus, one head could be used to lay down such tracks.

The present invention has been described in relation to a rotary head assembly as shown in FIG. 3, however, the present invention may also be advantageously used when the tape is wound over the drum for an angular range which is substantially the same as the angular separation between the two rotary heads. Also, while the tracking signal region $A_T$ has been described as always being located at one end of each track, such tracking signal region $A_T$ can be formed at two or more places, for example, it could be at both end portions of the track or it could be arranged at the center thereof. All that is required is that the appropriate timing signals be developed so that the location and spacing are accurately controlled.

Although illustrative embodiments of the present invention has been described in detail above with reference to the accompanying drawings, it is to be understood that the invention is not limited to those precise embodiments, and that various changes and modifications can be effected therein by one skilled in the art without departing from the spirit and scope of the invention, as defined by the appended claims.

What is claimed is:

1. A method of recording digital signals on a magnetic record medium using a rotary head that periodically traces the magnetic record medium, the method comprising the steps of:

recording a digital information signals at first predetermined areas in each of a plurality of slanted tracks formed on said magnetic medium by said rotary head and in which said slanted tracks are formed by said rotary head with no guard bands between adjacent tracks;

determining second predetermined areas on each of said slanted tracks, different than said first predetermined areas;

recording a tracking pilot signal on at least every other one of said plurality of slanted tracks in said second predetermined areas at predetermined positions separated from an end of said slanted tracks in a longitudinal direction thereof; and applying an erase signal using said rotary head for erasing signals previously recorded in said second predetermined areas at a location not having said tracking pilot signal recorded thereat.

2. A method of recording digital signals according to claim 1, in which said step of recording a tracking pilot signal includes the step of providing said tracking pilot signal having a single frequency and recording said tracking pilot signal with no discernable phase difference between successive tracks.

3. A method of recording digital signals according to claim 1, in which said step of recording a tracking pilot signal includes the step of providing said tracking pilot signal having two different frequencies and said step of recording a pilot signal includes the step of alternating between said two different frequencies each time said tracking pilot signal is recorded in said second predetermined area on alternate ones of said plurality of slanted tracks.

4. A method of recording digital signals according to claim 1, in which the step of recording said tracking pilot signal includes the step of recording alternate ones of said tracking pilot signals in said second predetermined areas at second predetermined positions different than the first mentioned predetermined positions therein.

5. A method of recording digital signals according to claim 4, in which said tracking pilot signals are recorded in said first predetermined positions by a first rotary head and said tracking pilot signals are recorded in said second predetermined positions by a second rotary head.

6. A method of recording digital signals according to claim 1, in which the step of applying an erase signal includes the further step of applying the erase signal over the entire extent of said second predetermined areas on each of said slanted tracks not having a tracking pilot signal recorded thereon.

7. A method of recording digital signals according to claim 1, in which the step of applying an erase signal includes the further step of applying the erase signal at a second predetermined position adjacent said tracking pilot signal in said second predetermined area in said every other ones of said slanted tracks.

8. A method of recording digital signals according to claim 1, further comprising the steps of:
tracing a track recorded by said rotary head with a playback head;
reproducing the tracking pilot signal at said second predetermined areas from both tracks adjacent said track being traced;
comparing the levels of sid tracking pilot signals reproduced from said adjacent tracks;
generating a head tracking signal in response to said level comparision; and
controlling said playback head in response to said head tracking signal.

9. Apparatus for recording digital signals in a plurality of slanted tracks on a magnetic record medium by a rotary head that periodically traces said magnetic record medium, the apparatus comprising:
means for recording a digital information signal at first predetermined area in each of said plurality of slanted tracks on said magnetic medium by said rotary head in which said slanted tracks are formed by said rotary head with no guard bands between adjacent track;
means for determining a second predetermined area on each of said slanted tracks, different than said first predetermined area;

means for recording a tracking pilot signal in at least every other one of said plurality of slanted tracks in said second predetermined areas at predetermined positions separated from an end of said slanted tracks in a longitudinal direction thereof; and
means for applying an erase signal using said rotary head for erasing signals previously recorded in said second predetermined area on each of said slanted tracks at a location not having said tracking pilot signal recorded thereat.

10. Apparatus for recording digital signals according to claim 9, further comprising means for generating said tracking pilot signal having a single predetermined frequency and with no discernable phase difference between tracking pilot signals recorded in successive tracks.

11. Apparatus for recording digital signals according to 9, further comprising means for generating said tracking pilot signals having two different frequencies and means for alternately providing said two different frequency tracking pilot signals to said means for recording a tracking pilot signal.

12. Apparatus for recording digital signals according to claim 8, further comprising:
playback head means for tracing a track recorded by said rotary head;
means connected to said playback head means for reproducing the tracking pilot signals recorded at said second predetermined areas from both tracks adjacent said track being traced;
means for comparing the levels of said reproduced tracking pilot signals from said adjacent tracks and producing a level comparison output signal therefrom;
means for generating a tracking signal in response to said level comparison output signal; and
means for controlling tracking alignment of said playback head means in response to said tracking signal.

13. Apparatus for recording digital signals according to claim 12, in which said means for generating a tracking signal includes means for alternating the polarity thereof in response to the number of the slanted track being reproduced.

14. Apparatus for recording digital signals according to claim 9, further comprising means for recording alternate ones of said tracking pilot signals at said predetermined positions in said second predetermined areas different than the first-mentioned predetermined positions therein.

15. Apparatus for recording digital signals according to claim 14, in which said tracking pilot signals are recorded in said first predetermined positions by a first rotary head and said tracking pilot signals are recorded in said second predetermined positions by a second rotary head.

16. Apparatus for recording digital signals according to claim 9, in which said means for applying an erase signal includes means for applying said erase signal over the entire extend of said second predetermined area on the remaining ones of said slanted tracks not having a tracking pilot signal recorded therein.

17. Apparatus for recording digital signals according to claim 9, in which said means for applying an erase signal includes means for applying said erase signal at a second predetermined position adjacent said tracking pilot signal in said second predetermined area in said every other ones of said slanted tracks.

18. A method of recording signals as a plurality of slanted tracks on a record medium by using a rotary head that periodically traces the record medium, the method comprising the steps of:
- recording a digital information signal at first predetermined areas on each of said plurality of slanted tracks, said slanted tracks being formed with no guard bands between adjacent tracks;
- determining a second predetermined area on each of said slanted tracks, different than first predetermined area;
- recording a tracking pilot signal at a predetermined position that is a longitudinal distance from an end of said slanted track on each of said plurality of slanted tracks at a first selected position in said second predetermined areas; and
- applying an erasing signal using said rotary head for erasing signals previously recorded at a second selected position in said second predetermined areas.

19. A method of recording digital signals according to claim 18, in which said step of recording a tracking pilot signal includes the step of providing said tracking pilot signal having two different frequencies and alternating between said two different frequencies each time said tracking pilot signal is recorded in said second predetermined area on alternate ones of said plurality of slanted tracks.

20. A method of recording digital signals according to claim 18, further comprising the steps of:
- tracing a track recorded by said rotary head with a playback head;
- reproducing the tracking pilot signal at said second predetermined areas from both tracks adjacent said track being traced;
- comparing the levels of said tracking pilot signals reproduced from said adjacent tracks;
- generating a tracking signal in response to said level comparison; and
- controlling tracking alignment of said playback head in response to said tracking signal.

* * * * *